O. W. HART.
ROLLER BEARING.
APPLICATION FILED JUNE 8, 1917.

1,258,002.

Patented Mar. 5, 1918.

INVENTOR.
Orlando W. Hart.
by William A. Hardy.
HIS ATTY.

UNITED STATES PATENT OFFICE.

ORLANDO W. HART, OF FALL RIVER, MASSACHUSETTS.

ROLLER-BEARING.

1,258,002.

Specification of Letters Patent.

Patented Mar. 5, 1918.

Application filed June 8, 1917. Serial No. 173,473.

*To all whom it may concern:*

Be it known that I, ORLANDO W. HART, a citizen of the United States, and a resident of Fall River, Bristol county, Massachusetts, have invented certain new and useful Improvements in Roller-Bearings, of which the following is a description.

My invention relates to roller bearings and more particularly to roller bearings of the type disclosed in Patent #1,205,449 granted to me on November 21, 1916, and entitled roller bearings.

One of the objects of my invention is to provide an improved construction and arrangement for holding the parts of a roller bearing, especially a roller bearing such as described in my patent referred to above, in proper relative position, even upon the removal of the shaft, spindle, or sleeve around which the bearing may be arranged.

Another object of my invention is to facilitate the assembly of the parts of a roller bearing about a shaft or spindle.

A further object of the invention is to provide a structure for attaining the objects above set forth, which is light, efficient and of simple construction, which will not interfere with the normal operation of the bearing and wherein wear and friction are reduced to a minimum.

Other objects and features of my invention will be hereinafter more fully described and claimed.

For a clearer understanding of my invention, attention is directed to the drawing accompanying and forming a part of this specification, in the several views of which like parts are designated by the same reference characters, and in which.

Figure 1:
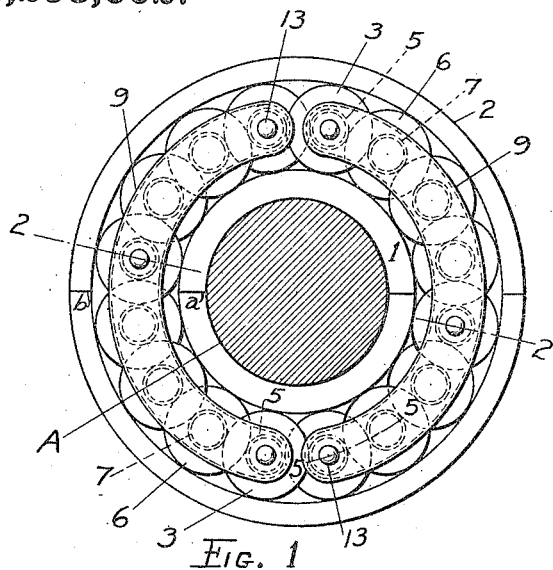
Figure 1 is a view in end elevation, partly in section, of a roller bearing provided with my invention.

Referring to the drawing, reference character A represents a shaft to which a hardened cylindrical sleeve or inner bearing member 1 is rigidly secured in any suitable manner. Spaced from the inner bearing member or sleeve 1 is an outer hardened bearing member or sleeve 2, and between the sleeves 1 and 2 is disposed a plurality of annular series of rolls, three such series, B, C and D being shown in the drawing. The corresponding rolls 3 and 4 of the alternate or two outside series B and D are respectively rotatably mounted on hollow shafts 5 and the rolls 6 of the intermediate series C are respectively rotatably mounted on hollow shafts 7. The shafts and rolls of each series of rolls respectively coact with the rolls and shafts of adjacent series to maintain the rolls of each two adjacent series in staggered relation, in the manner described in Patent, 1,205,449, referred to above. The hollow shafts 5 and 7 are preferably provided with perforations 8 and consequently lubricant is adapted to be thoroughly distributed to all parts of the bearing in the rotation of the rolls on their shafts and in the rotation of the series of rolls B, C and D about the axis of the bearing.

The sleeves or bearing members 1 and 2 may either be solid or split, as at *a* and *b*, into sections. They are split, for example, where it is desired to dispose the bearing about a portion of a shaft located between fixed flanges as in transmission shafting, or about a portion of a crankshaft or any shaft where it would be difficult or impossible to apply the bearing members from either end of the shaft.

Figure 2:
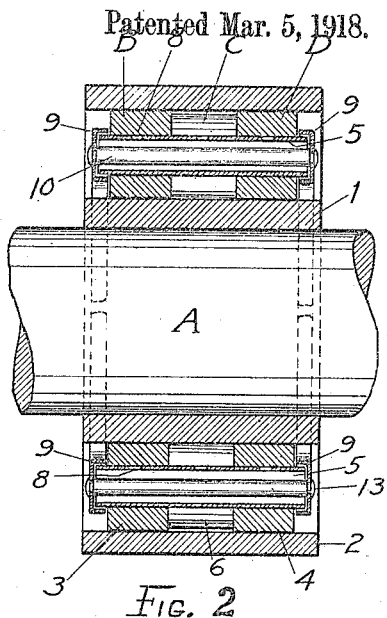
Fig. 2 is a central sectional view taken on line 2—2 of Fig. 1.
Figure 3:
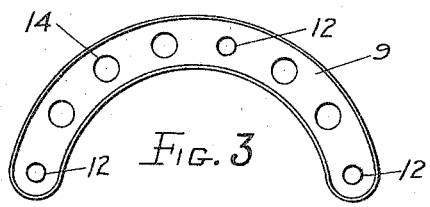
Fig. 3 is a rear elevation view of a modified form of the segmental retaining members shown in Fig. 1.
Figure 4:
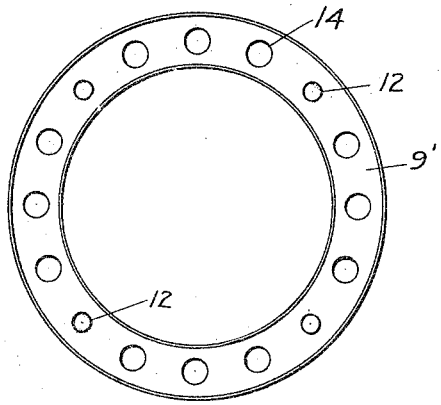
Fig. 4 is a similar view of a circular form of retaining member which may be used instead of the segmental retaining members shown in Fig. 1.
Figure 5:
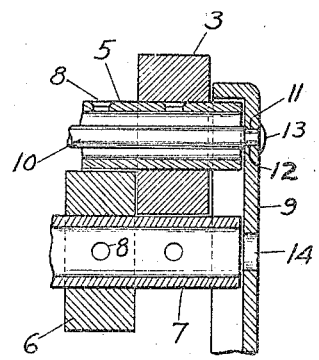
Fig. 5 is an enlarged detailed sectional view taken on line 5—5 of Fig. 1 and showing the form of retaining member illustrated in Fig. 3.

With the construction described above, if the shaft A and sleeve or bearing member 1 be removed, the rolls 3, 4 and 6 would be apt to collapse or fall inwardly unless the same and the alining shafts 5 and 7 were in a comparatively tight relation. Also should the outer bearing member 2 be removed, the rolls and alining shafts would fall apart. In either case, it would be very difficult to reassemble the rolls and alining shafts of the bearing and to replace the part or parts removed from the assembly. In order to obviate these objections, each of the shafts 5 and 7 is preferably of such a length as to extend beyond both end roll surfaces of the bearing, and the extending end portions of these shafts are preferably respectively loosely disposed in annularly extending channels provided in retaining members located adjacent the ends of the bearing and suitably secured together in proper spaced relation. In the construction shown in Figs. 1 and 2 the annularly extending channels in which the extending end portions of 5 and 7 are disposed, are provided by two opposed pairs of segmental retaining members 9 respectively located adjacent the ends of the bearing, each of the members 9 being U shaped in cross section and extending through an arc slightly less than a semicircle. The corresponding retaining members 9 at the two ends of the bearing are rigidly secured together in such spaced relation that the series of rolls B, C and D will be loosely disposed therebetween, preferably by means of several rods 10 extending through some of the hollow shafts 5 and 7. These rods are provided with reduced end portions 11 which extend through openings 12 provided therefor in members 9 and have their ends upset or provided with rivets, as shown at 13, whereby the rods are securely fastened to the retaining members 9 and serve to hold the latter in proper spaced relation. In certain cases the shafts on which the rolls 3, 4 and 6 are mounted may be employed to secure the channeled retaining members 9 together in spaced relation, for example where solid shafts instead of the hollow shafts 5 and 7 are used. Where the bearing is to be applied to a stationary transmission shaft or other shaft where it is impossible or difficult to slip the bearing to position from the ends of the shaft, the segmental channeled retaining members 9 are employed, as their use enables all the rolls 3, 4 and 6 and shafts 5 and 7 to be readily and quickly applied about the shafts at any desired point. Where the roller bearing is applicable to the shafts from the end thereof, a channeled retaining ring, such as shown at 9' in Fig. 4, may be employed in place of each pair of the segmental channeled retaining members 9 of the bearing shown in Figs. 1 and 2. In order to obtain an improved circulation and distribution of the lubricant in the bearing, the bottom of the channels of the retaining members 9 and 9' are preferably provided with large apertures or oil holes 14 as shown in Figs. 3, 4 and 5 at points opposite the ends of those hollow shafts 5 and 7 through which rods 10 do not extend.

The ends of shafts 5 and 7 preferably fit quite loosely within the channels provided therefor by the members 9 or 9', and consequently the retaining means has practically no effect in the normal operation of the bearing, other than to prevent any substantial endwise movement of the shafts 5 and 7 with respect to the rolls 3, 4 and 6. Owing to the lightness and construction of the retaining means, comprising the simple parts 9 and 10, substantially no additional wear and friction results from its use.

While I have described a preferred embodiment of my invention it is to be understood that the same is subject to many modifications and changes in the size, shape and arrangement of parts without departing from the spirit of the invention and the scope of the appended claims.

Having now described my invention, what I claim and desire to protect by Letters Patent is as follows:—

1. In a roller bearing, a plurality of annular series of rolls, hollow shafts on which the rolls of each series are respectively mounted, the ends of each shaft respectively extending beyond the end roll surfaces of the bearing, devices having annularly extending channels in which the extending end portions of said shafts are respectively disposed, and means extending through some of said shafts for holding said devices in position.

2. In a roller bearing, an annular series of rolls, shafts on which said rolls are respectively rotatably mounted, means coacting with said shafts for maintaining the rolls in proper relative position comprising a pair of annularly extending devices respectively disposed on either side of said series, said means being unattached to said shafts.

3. A segmental roller bearing section comprising a segmental series of rolls, shafts on which said rolls are respectively mounted and which extend beyond the sides of the series of rolls, and a pair of segmental channeled members held together in spaced relation and in the channels of which the extending end portions of said shafts are respectively disposed.

4. A segmental roller bearing section comprising a segmental series of rolls, hollow shafts on which said rolls are respectively rotatably mounted and which extend beyond the sides of said series, and a pair of segmental channeled members respectively disposed adjacent the sides of said series of rolls and in the channels of which the extending end portions of said shafts are respectively located, said members being secured together to maintain the same in proper spaced relation, and the bottoms of said channels being apertured adjacent the respective ends of some of said shafts.

5. A roller bearing comprising an annular series of rolls mounted for rotation about the axis of the bearing, shafts on which said rolls are respectively rotatably mounted, and a pair of members respectively disposed adjacent the sides of said series and mounted to rotate therewith about the axis of the bearing, said members being unattached to said shafts and having means coacting with said shafts to maintain said rolls in proper assembled position.

6. In a roller bearing, a plurality of annular, concentric series of rolls, the rolls of adjacent series being in staggered relation, hollow shafts on which the corresponding rolls of alternate series are respectively rotatably mounted, each of said shafts extending beyond the end roll surfaces of the bearing, members having annularly extending channels in which the extending end portions of said shafts are respectively disposed, and means comprising devices extending through some of said shafts for holding said members together in spaced relation.

7. In a roller bearing, a plurality of annular, concentric series of rolls, the rolls of adjacent series being in staggered relation, hollow shafts on which the corresponding rolls of alternate series are respectively rotatably mounted, each of said shafts extending beyond the end roll surfaces of the bearing, members having annularly extending channels in which the extending end portions of said shafts are respectively disposed, and means comprising devices extending through some of said shafts for holding said members together in spaced relation, the bottom of said channels being apertured adjacent the respective ends of some of said shafts.

8. In a roller bearing, a plurality of annular concentric series of rolls rotatable about the axis of the bearing, the rolls of adjacent series being in staggered relation, shafts on which the corresponding rolls of alternate series are mounted, the shafts and rolls of each series respectively coacting with the rolls and shafts of adjacent series to maintain the rolls of adjacent series in such staggered relation, and means mounted to rotate with said plurality of series about the axis of the bearing and coacting with said shafts to maintain the latter and thereby the rolls in proper assembled position.

9. In a roller bearing, a plurality of annular series of rolls, hollow shafts on which the rolls of each series are respectively rotatably mounted, the ends of said shafts extending beyond the end roll surfaces of the bearing, a pair of members having annularly extending channels in which the extending end portions of said shafts are respectively disposed, and rods extending through some of said shafts and having their ends respectively secured to said members to thereby maintain the latter in proper spaced relation.

10. In a roller bearing, an annular series of rolls, shafts on which said rolls are respectively mounted, the ends of each shaft respectively extending beyond the end roll surfaces of the bearing, and devices held together in spaced relation and having annularly extending channels in which the extending end portions of said shafts are respectively disposed.

This specification signed and witnessed this 6th day of June, 1917.

ORLANDO W. HART.

Witnesses:
HARRY H. PICKING,
M. L. INGERSOLL.

Copies of this patent may be obtained for five cents each, by addressing the "Commissioner of Patents, Washington, D. C."